United States Patent
Shyu et al.

(10) Patent No.: US 6,840,632 B2
(45) Date of Patent: Jan. 11, 2005

(54) PROJECTION OPTICAL SYSTEM HAVING A WEDGE PRISM

(75) Inventors: Jyh-Horng Shyu, Hsinchu (TW); Chu-Ming Cheng, Hsinchu (TW); S-Wei Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 10/651,990

(22) Filed: Sep. 2, 2003

(65) Prior Publication Data

US 2004/0070854 A1 Apr. 15, 2004

(30) Foreign Application Priority Data

Oct. 9, 2002 (TW) ...................................... 91216705 U

(51) Int. Cl.$^7$ .............................................. G03B 21/14
(52) U.S. Cl. ........................................ 353/81; 353/98
(58) Field of Search .............................. 353/33, 81, 98; 359/833

(56) References Cited

U.S. PATENT DOCUMENTS

| | | | | |
|---|---|---|---|---|
| 3,704,936 A | * | 12/1972 | Gorkiewicz et al. | 359/293 |
| 5,673,986 A | * | 10/1997 | Koo | 353/98 |
| 6,352,346 B1 | * | 3/2002 | Kasai | 353/98 |
| 6,688,748 B2 | * | 2/2004 | Lewis et al. | 353/69 |

* cited by examiner

Primary Examiner—William C. Dowling
(74) Attorney, Agent, or Firm—Bacon & Thomas, PLLC

(57) ABSTRACT

A projection optical system includes a light source emitting light, a light valve with a surface in front of the light source, and a wedge prism disposed in the optical path from the light source to the light valve. By means of the wedge prism with different sectional thickness, the optical path and focus position of the light beam can be corrected. Therefore, the distortion produced by oblique incidence on to the light valve can be improved such that the light optical focus on the surface of the light valve to achieve the improvement of light spot on light valve and raise the uniformity, collection efficiency, and brightness.

4 Claims, 6 Drawing Sheets

PROJECTION OPTICAL SYSTEM HAVING A WEDGE PRISM

BACKGROUND OF THE INVENTION

1. Field of the Invention

The present invention relates to a projection optical system, and more particularly to a projection optical system having a wedge prism for light collection efficiency.

2. Description of the Related Art

As shown in FIG. 1, a light source module 1, a color wheel 3, an integration rod 4, and a relay lens 5 are coaxial in a prior art non-telecentric projection optical system, but a light valve 6 and a projection lens 7 aren't coaxial with the above-mentioned devices. As the light source module 1 producing a illuminating light beam, travels through the color wheel 3, the integration rod 4, and the relay lens 5 into a reflection mirror 8. The reflection mirror 8 reflects the light beam obliquely into the light valve 6. After dealt by the light valve 6, the images through the projection lens are finally formed on the projection screen 9.

Because of the reflection illuminating light beam's oblique incidence on the light valve 6, the reflection optical paths from the reflection mirror 8 to each pixel on the light valve 6 do not extend over the same distance. As shown in FIG. 2, the reflection illuminating light beam should have the same optical path and focus on focuses Fa, Fb, and Fc, but because of the different optical path lengths, only the central focus Fb can focus on the right position. The focuses fa and Fc can't certainly focus and cause the defocus phenomenon. As a result, the illuminating light beam can't certainly focus on the light valve 6 and cause the illuminating area on the plane of the light valve 6 to increase. As shown in FIG. 3, the light spot (shown in A, B) on the same plane of the light valve 6 is deformed, and forms lower and non-uniform brightness, affecting the collection efficiency of the light valve 6.

SUMMARY OF THE INVENTION

An object of the present invention is to provide a projection optical system having a wedge prism, which raises the uniformity, collection efficiency, and brightness of the light valve.

Another object of the present invention is to provide a projection optical system having a wedge prism, which improves the defocus phenomenon produced by oblique incidence on to the light valve.

Another object of the present invention is to provide a prism optical system having a wedge prism, which disposes the wedge prism in the optical path to correct the illuminating light beam focus position and the distortion of the light spot on the light valve surface.

To achieve the above and other objects, in the present invention, a projection optical system having a wedge prism includes a light source emitting light, a light valve with a surface in front of the light source, and a wedge prism disposed in the optical path from the light source to the light valve. By means of the wedge prism with different sectional thickness, the optical path and focus position of the light can be corrected. Therefore, the distortion produced by oblique incidence on to the light valve can be improved such that the light optical focus on the surface of the light valve to achieve the improvement of light spot on light valve and raise the uniformity, collection efficiency, and brightness.

BRIEF DESCRIPTION OF THE DRAWINGS

The above and other objects, advantages, and features of the present invention will be understood from the following detailed description of the invention when considered in connection with the accompanying drawings below.

DETAILED DESCRIPTION OF THE INVENTION

Figure 1:
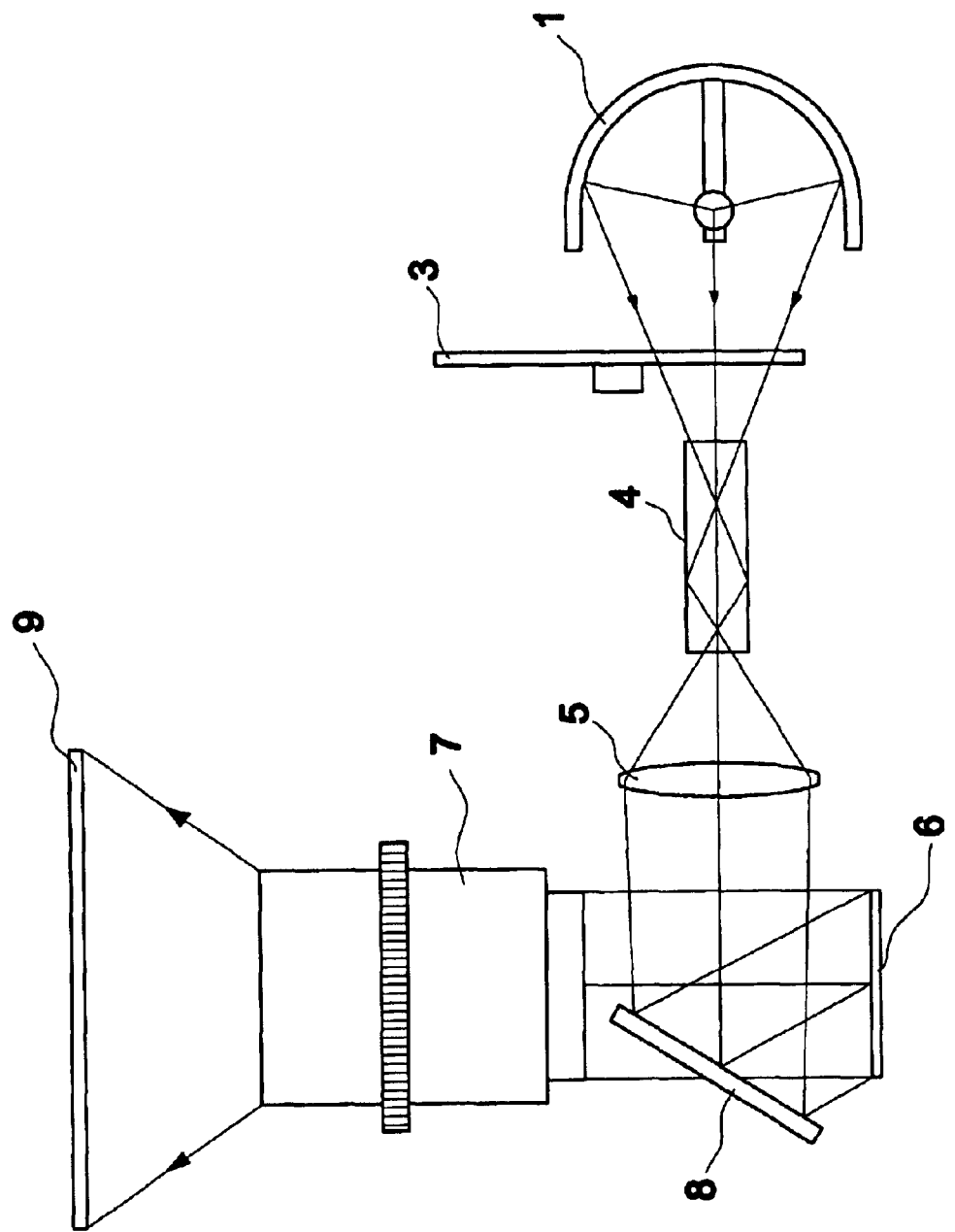
FIG. 1 is a non-telecentric optical path view of the projection optical system of the prior art.
Figure 2:
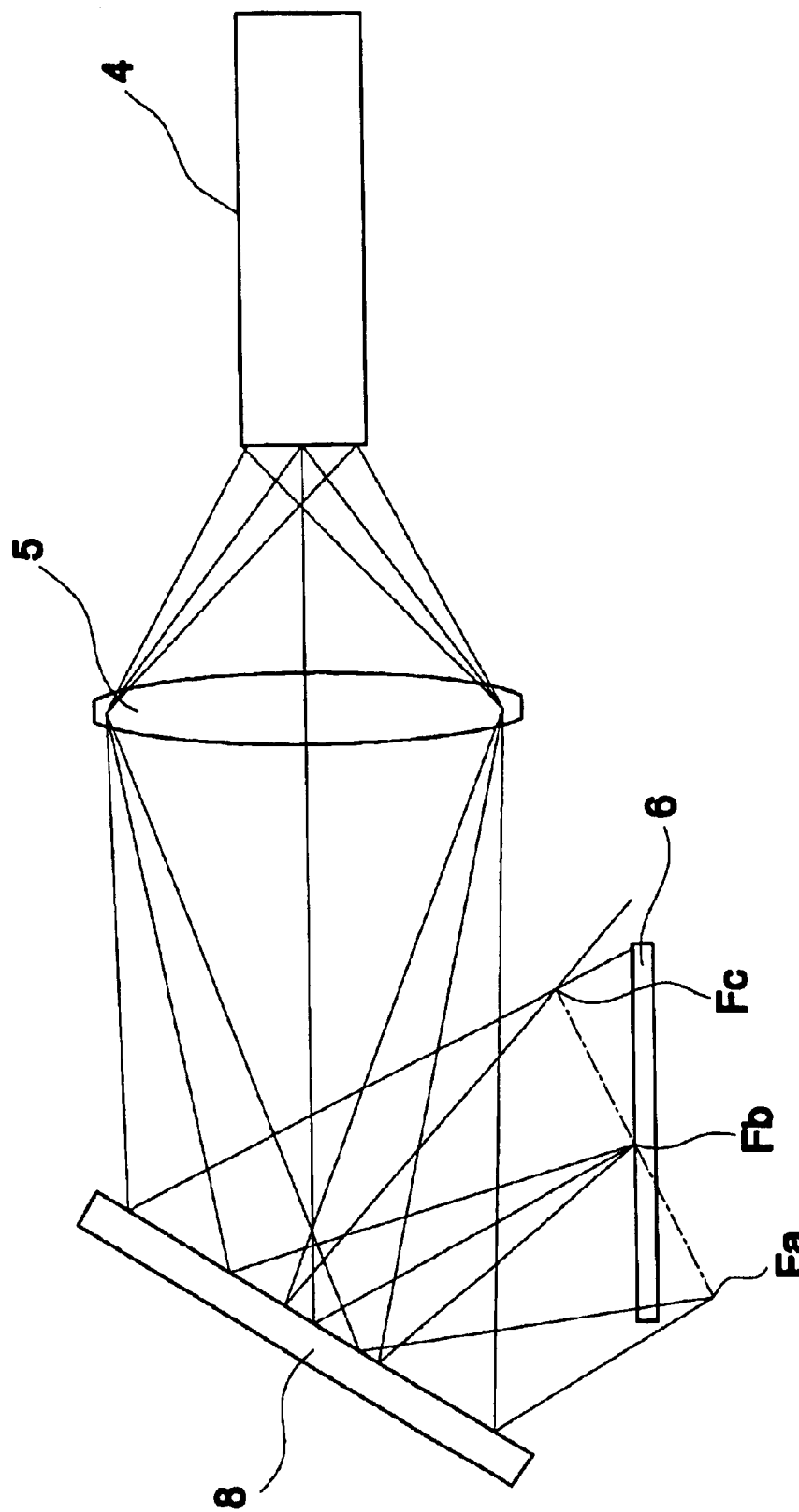
FIG. 2 is a schematic view showing that the illuminating light beam obliquely impinges into a light valve and causes the defocus of the prior art.
Figure 3:
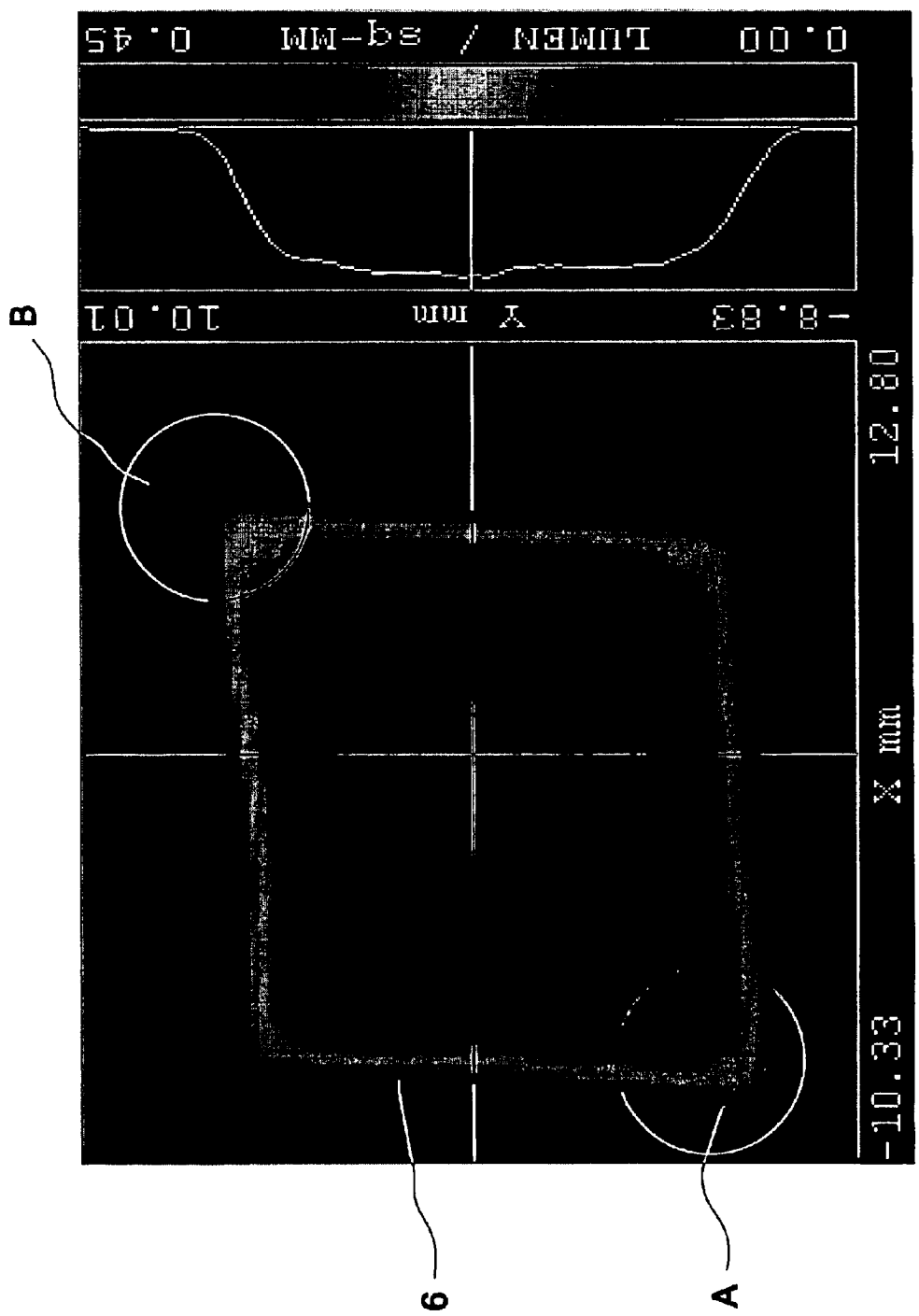
FIG. 3 is a light spot brightness distribution view of the light valve surface of the optical system of the prior art.
Figure 4:
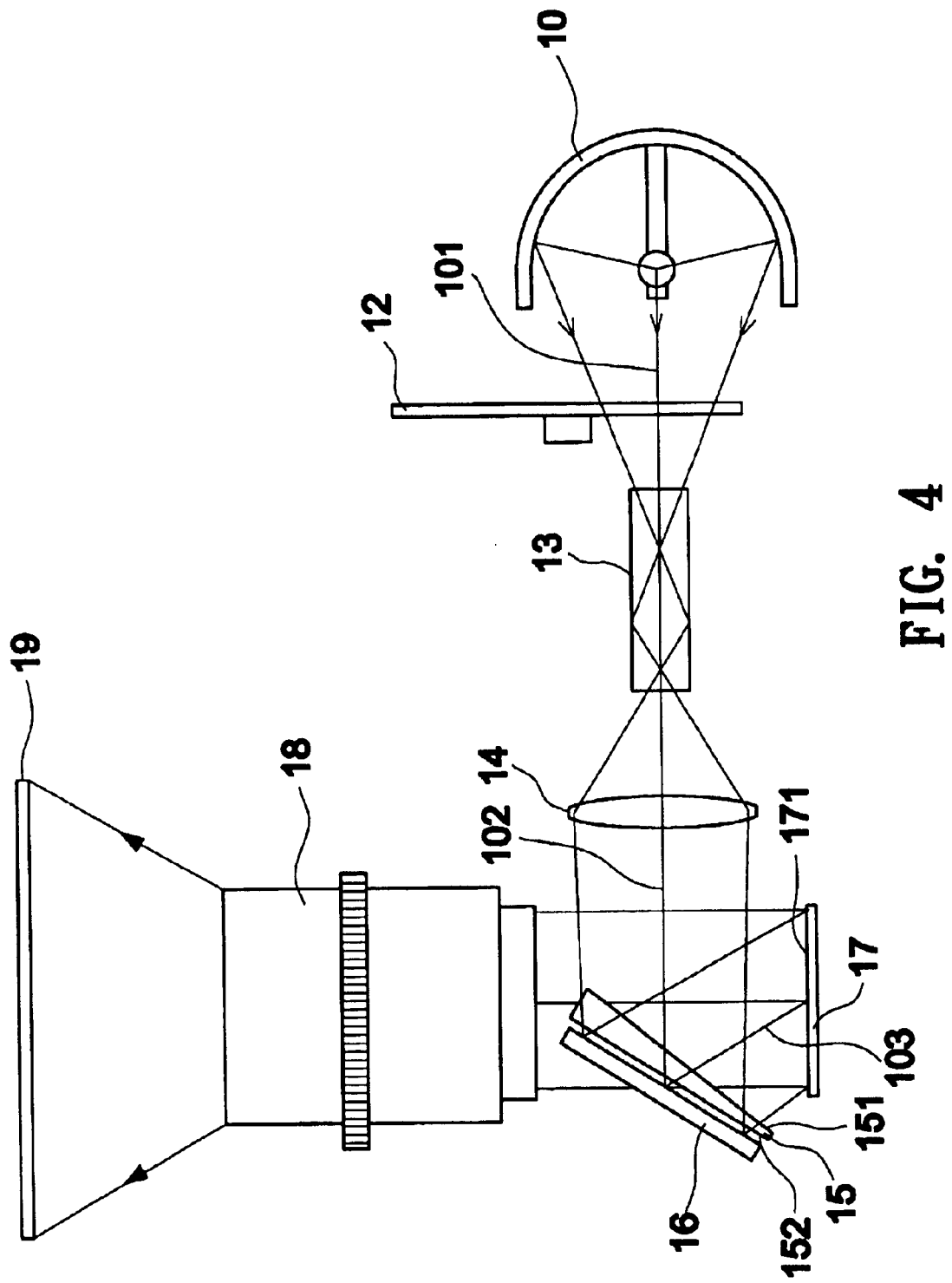
FIG. 4 is a schematic view showing the optical path of the projection optical system of the first embodiment of the present invention.

Referring to FIG. 4 which shows the first embodiment of the present invention, a projection optical system having a wedge prism 15 sequentially comprises a light source 10, a color wheel 12, an integration rod 13, a relay lens 14, a wedge prism 15, a reflection mirror 16, a light valve 17 having a surface 171, a projection lens 18, and a projection screen 19, wherein a surface 171, a projection lens 18, and a projection screen 19 are not coaxial with the other above-mentioned devices.

An illuminating light beam bundle 101 is produced by the light source 10, and travels through the color wheel 12, the integration rod 13, and the relay lens 14 to filter, make uniform, and collect the light beam. The relay lens 14 directs an illuminating light beam bundle into the wedge prism 15. The wedge prism 15 includes two opposite surfaces 151 and 152, and has different sectional thicknesses. The illuminating light beam 102 bundle is incident on the surface 151 of the wedge prism 15, and then refracted, and passes through the surface 152 onto the adjacent reflection mirror 16. The reflected illuminating light beam 103 passes through the wedge prism 15 again, is refracted by the wedge prism 15, passes through the surface 151, and is obliquely incident on the light valve 17. After reflection by the light valve 17, the illuminating light beam 103 passes through the projection lens 18 and finally projects onto the projection screen 19.

Figure 5:
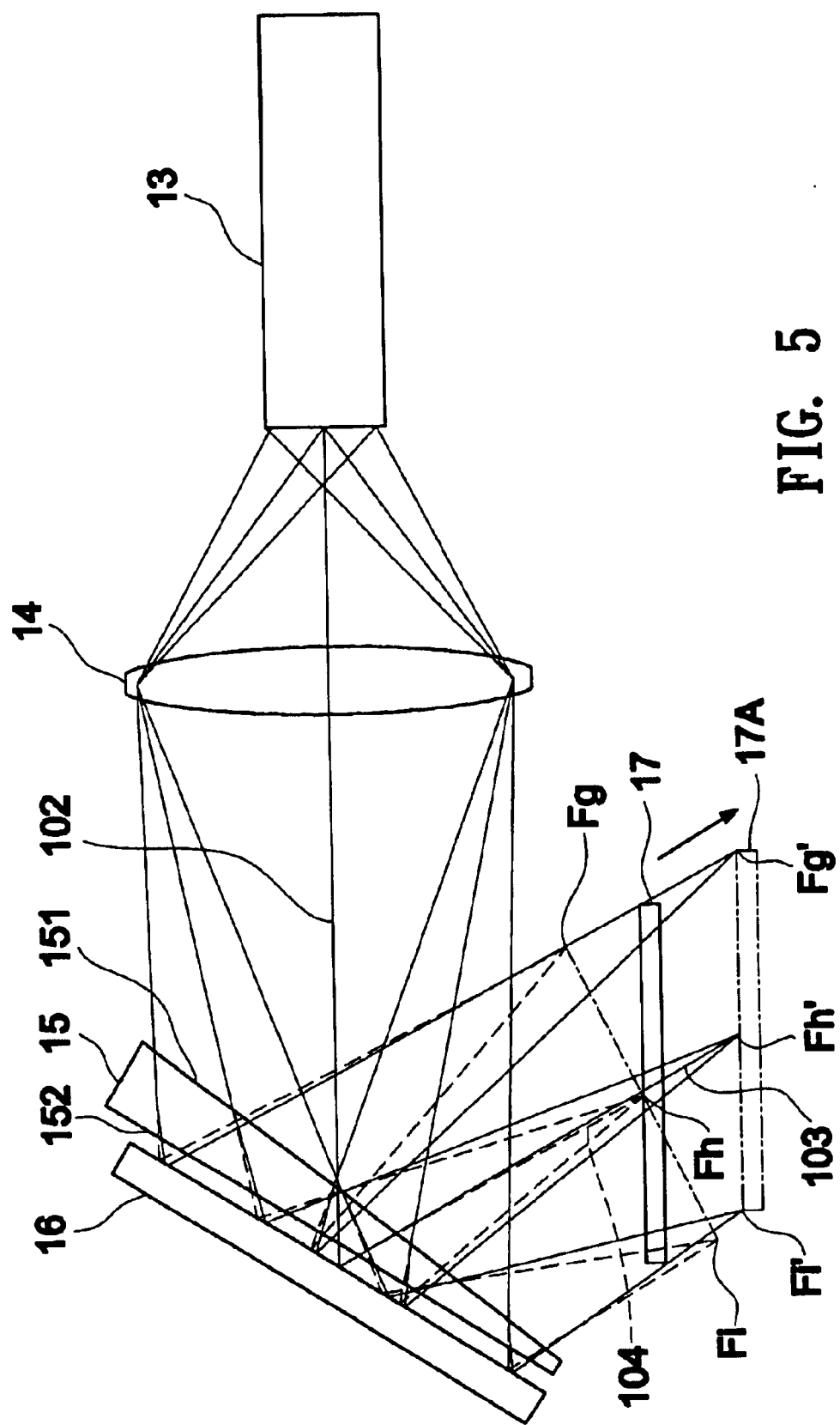
FIG. 5 is a schematic view showing the correct focuses optical path of the first embodiment of the present invention.

Referring to FIG. 5, an optical system of the prior art only uses a reflection mirror 16 to reflect an optical path as shown by the dotted line. As known, the illuminating light beam 102 from the relay lens 14 is directly incident on the reflection mirror 16, and a reflection illuminating light beam 104 focuses on the focus Fg, focus Fh, and focus Fi. However, the focuses Fg and Fi aren't on the light valve 17. The present invention allows the optical path to be adjusted by the wedge prism 15 as the real line. The illuminating light beam 102 from the relay 10 passes through the wedge prism 15 into the reflection mirror 16 and then the reflected illuminating light beam 10 passes through the wedge prism 15 into the light valve 17. By adjusting the thickness of the prism 15 to re-focus the reflected illuminating light beam 103 on the focuses Fg', Fh', an Fi', the focuses Fg', Fh', and Fi' are in the same line and parallel to the light valve 17. By horizontally shifting the light valve 17 to the plane of the focuses Fg', Fh', a Fi', the light valve 17 shifts to the light valve 17A to focus the illuminating light beam and form a uniform light spot, which modifies the blurry and deformed light spot of the prior art and lowers the lightness loss caused by the defocus. The total lightness of the light valve is higher than the prior art to raise brightness and efficiency.

By adding the wedge prism 15, the illuminating light beam passes through the different thicknesses of the prism 15. The different thicknesses depend on the distance of the light path to the light valve 17. By means of different refraction rates and thicknesses of the wedge prism, the optical path and focus position of the light can be corrected. Furthermore, horizontally shifting the position of the light valve 17 to focus the illuminating light beam on the light valve 17 resolves the defocus problem and raises uniformity, collection efficiency, and the brightness of the light valve 17.

Figure 6:
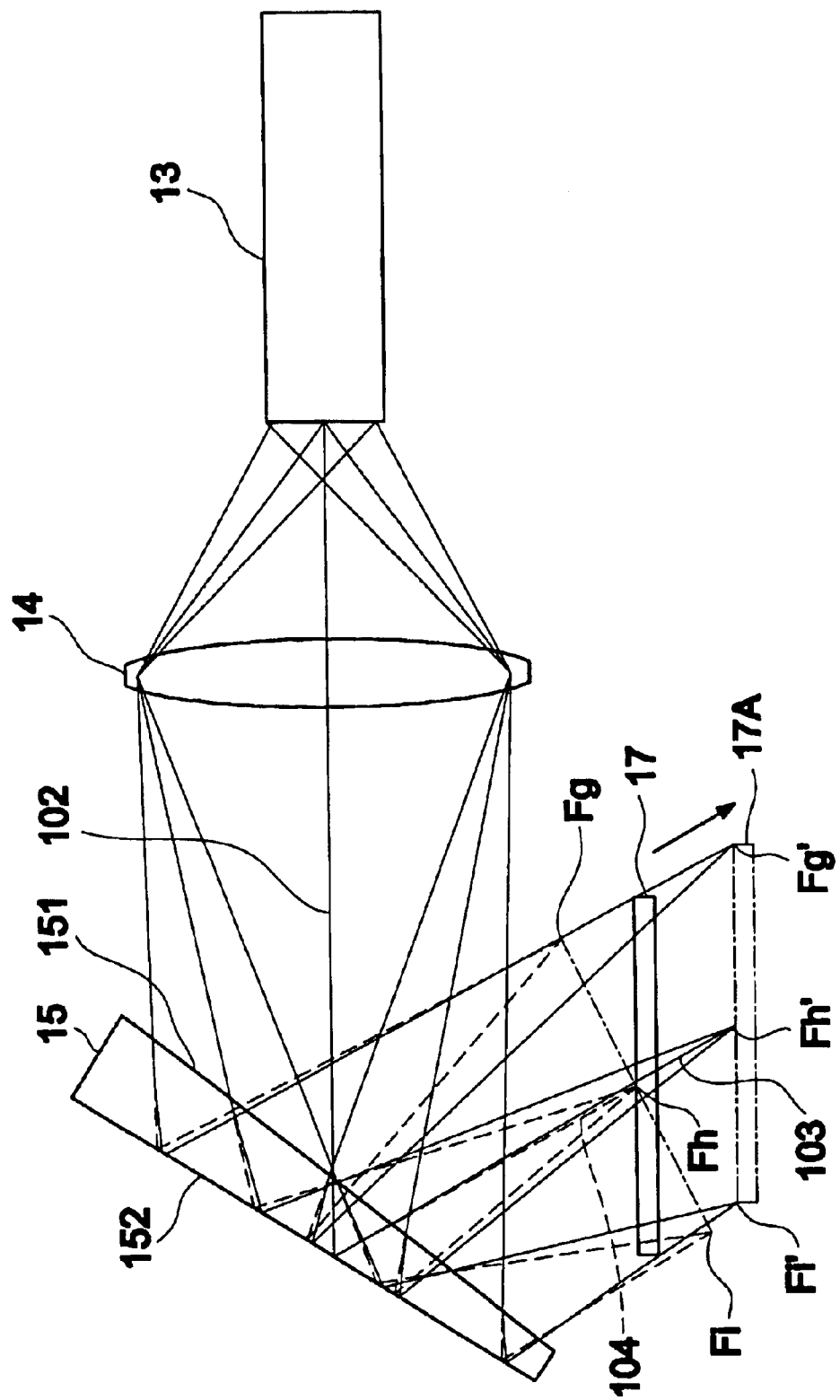
FIG. 6 a schematic view showing the correct focuses optical path of the second embodiment of the present invention.

Referring to FIG. 6 which shows a second embodiment of the present invention, an optical system of the present embodiment basically has the same construction with the above-mentioned first embodiment. The equal or similar devices are marked by the same reference numerals. The difference between the present embodiment and the first embodiment is to combine the wedge prism 15 surface 152 of the first embodiment with the adjacent reflection mirror 16 and form the surface 152 with a reflection surface such as cladding material or a total internal reflection surface. By means of the wedge prism 15 with different thicknesses to revise focus position, the light beam from the relay lens 14 is reflected and focused right on the light valve 17 to improve the defocus that causes the brightness loss from the edges of the light valve 17.

The present invention is not limited in using the wedge prism to resolve the distortion produced by oblique incidence, but for any optical devices that the light beam impinges into the optical devices by oblique incidence to dispose the wedge prism in the optical path into which the illuminating light beam impinges to correct the focus position onto the optical devices so as to achieve the improvement of the light spot uniformity, collection efficiency, and brightness.

It will be apparent to those skilled in the art that in light of the forgoing disclosure, many alternations and modifications are possible in the practice of this invention without departing from the spirit or scoop thereof. Accordingly, the scoop of the invention is to be considered in accordance with the substance defined in the following claims.

What is claimed is:

1. A projection optical system having a wedge prism, comprising:

at least one light source which provides at least one light beam;

a light valve which is disposed in front of said light source and has a surface, wherein said light beam is incident on said surface at an oblique angle;

a reflection mirror which is disposed in an optical path from said light source to said light valve tor reflects said light beam toward said light valve; and at least one wedge prism which is disposed in the optical path between said light source and said reflection mirror, and between said reflection mirror and said light valve such that said light beam focuses on said surface of said light valve.

2. A projection optical system having a wedge prism according to claim 1, wherein said wedge prism is disposed in the incident optical path of said light valve.

3. A projection optical system having a wedge prism according to claim 1, wherein said wedge has different sectional thicknesses depending on a distance of the light path to the light valve.

4. A projection optical system having a wedge prism according to claim 1, wherein said reflection mirror is formed as a reflection surface of said wedge prism.

* * * * *